(12) United States Patent
Chen et al.

(10) Patent No.: US 7,005,163 B2
(45) Date of Patent: Feb. 28, 2006

(54) ORGANIC-INORGANIC HYBRID FILM MATERIAL AND ITS FABRICATION

(75) Inventors: Wen-Chang Chen, Taipei (TW); Wei-Jung Lin, Taipei (TW)

(73) Assignee: Chang Chun Plastics Co., Ltd., Taipei (TW)

( * ) Notice: Subject to any disclaimer, the term of this patent is extended or adjusted under 35 U.S.C. 154(b) by 0 days.

(21) Appl. No.: 10/667,666

(22) Filed: Sep. 23, 2003

(65) Prior Publication Data

US 2004/0110014 A1    Jun. 10, 2004

(51) Int. Cl.
*B05D 3/02*    (2006.01)

(52) U.S. Cl. .................. 427/387; 525/431; 528/26; 528/38; 428/447; 428/473.5

(58) Field of Classification Search .............. 528/26, 528/38; 428/447, 473.5

See application file for complete search history.

(56) References Cited

U.S. PATENT DOCUMENTS 5,962,113 A * 10/1999 Brown et al. ............... 428/209
6,011,123 A * 1/2000 Kurosawa et al. .......... 525/431

FOREIGN PATENT DOCUMENTS

JP        4-189866 A  *  7/1992

* cited by examiner

*Primary Examiner*—Marc Zimmer
(74) *Attorney, Agent, or Firm*—Bacon & Thomas, PLLC

(57) ABSTRACT

The present invention relates to an organic-inorganic hybrid film material consisting of polyamide and either polysilsesquioxane or silicon alkoxide and to a process for producing the organic-inorganic hybrid film material. The present process can effectively reduce the phase separation and can produce an organic-inorganic hybrid film material having 0–100% organic content. The present process can control desired properties of the resultant hybrid film material by adjusting the ratio of the organic and inorganic material, such as refractive index, birefractive index, dielectric index, and plateness of the film. Also, the present organic-inorganic hybrid film material possesses excellent heat-resistivity and is suitable for an IC process requiring high processing temperature.

6 Claims, 13 Drawing Sheets

Reaction Scheme poly(amic acid) having molecular weight of 1000 poly(amic acid) having molecular weight of 5000 poly(amic acid) having molecular weight of 1000 without addition of coupling agent

ORGANIC-INORGANIC HYBRID FILM MATERIAL AND ITS FABRICATION

FIELD OF THE INVENTION

One object of the present invention provides an organic-inorganic hybrid film material consisting of polyimide and either poly(silsesquioxane) or silicon alkoxide.

BACKGROUND OF THE INVENTION

Metal material, ceramic material, polymeric material, and electronic material are four main classes in current material science field. Each material owns its specific properties for certain use. For example, the polymeric material has advantages of its readily processing, robustness, resilience, corrosive-resistance, electrical-insulation, and low cost but has disadvantages of poor heat-resistance and mechanical property. The ceramic material has advantages of stiffness, low activity, thermal stability but has disadvantages of heavy and brittleness. It will develop a new material having new properties if someone takes advantages of one material for compensating shortcoming of another material. Such a concept attracts people's attention to further investigate an organic-inorganic material hybrid material.

Conventional composite has a domain in the order of microns to millimeters. In such a composite the organic or inorganic component mainly plays a role for varying a structure or function of the composite. Its preparation mainly comprises a physical blending. Additionally, the hybrid material is prepared by sol-gel or self-assembly process to hybridize the organic and inorganic material. For example, incorporation of organic material into inorganic master material will improve the inorganic material's brittleness and could render the inorganic material colors. Alternatively, incorporation of inorganic material into organic master material will improve the organic material's strength, heat-resistance and hygroscopicity. Thus, new material having novel properties will be developed through molecular design.

Conventional organic-inorganic material should always be heated at elevated temperature to achieve its complete cross-linking and remove moisture or solvent contained in the reaction system. Silica/polyimide hybrid material prepared from sol-gel process has been extensively investigated due to its excellent heat-resistance. Such a heat-resistance is useful especially in the IC production requiring to process at an elevated temperature. One process for producing the silica/polyimide hybrid material comprises the steps of physically mixing poly(amic acid) solution with tetraethyl orthosilicate (TEOS) solution, spin-coating and then heated and cured to form a film. However, a phase separation will occur in the reaction system. To avoid the phase separation, an approach is to introduce coupling agent into the system since coupling agent will provide a bonding between two immiscible materials. Analysis to the silica/polyimide hybrid material resides in its optical property, a ratio of the organic to inorganic material, and hygroscopicity. There are many kinds of silica/polyimide hybrid material including water-soluble hybrid material, stiff hybrid material, and photo sensitive hybrid material, each of which has different use.

Increasing with the maturation for developing the silica/polyimide hybrid material, more research to the silicon-based material has been conducted. Among them, poly(silsequioxane) has been attracted due to its low dielectric index. With decreasing of line width on integrated circuit board, there exists a problem of signal transmission delay. To decrease the effect of signal delay [Resistance Capacitor (RC) delay], one method is to decrease resistance by using copper process and another method is to decrease capacitor formed between two conductive lines by using insulator layer having low dielectric index. Thus, development of material having low dielectric index becomes a major subject in material science field recently. Among them, poly(silsesquioxane) has a dielectric index of from 2.6 to 2.9, which is far less than that of silica (i.e. dielectric index of 4.0).

Generally, poly(silsesquioxane) is prepared from a hydrolysis of trifunctional silane monomer and then condensation in which the functional groups are the same or different and selected from chloro, methoxy, or ethoxy. Molecular weight, structure of the condensing product and the number of terminal functional groups present in the condensing product are greatly affected by reaction conditions such as properties of monomer, reaction temperature, kinds of catalyst and solvents. Among poly(silsesquioxane), poly(methyl silsesquioxane)(PMSQ) is most popular and becomes an excellent low dielectric material since it has a dielectric index of 2.7, low hygroscopicity, excellent heat-resistance, and mechanical strength. However, PMSQ exhibits poor adhesion to silicon wafer and is brittle thus its use is limited. Introduction of organic polymer into PMSQ will overcome such disadvantages.

Using poly(silsesquioxane)/polyimide hybrid material to prepare low dielectric film is known. It is now describing as follows.

(1) Diamine is first reacted with dianhydride to form poly(amic acid). Then methyl trimethoxy silane monomer (MTMS, a starting monomer for poly(silsesquioxane)) and coupling agent are added into the poly(amic acid) solution to allow the MTMS hydrolyzing and condensing catalytically by using acidic property of the poly(amic acid). Finally, the resultant solution is coated on a substrate and cured to form a film. In this method, although addition of coupling agent provides a bonding between inorganic material and organic material, there still exists a problem of phase separation. This is because that it is difficult to control the MTMS reaction condition precisely, thus it is difficult to control the content of Si—OH and then results in poor property of the film due to phase separation. Moreover, a byproduct methanol still remains in the reaction system.

(2) Poly(silsesquioxane) and poly(amic acid alkyl ester) are prepared separately, and then mixed with addition of coupling agent to subject to a hybridization. Finally, the resultant hybrid material solution is coated on a substrate and cured to form a film. In this method, poly(amic acid alkyl ester) is used the precursor for polyimide, other than poly(amic acid). By using poly(amic acid alkyl ester) as the precursor for polyimide, it can be dissolved in more kinds of solvents but it also limits the ratio of organic material to inorganic material. For example, in such method, proportion of the polyimide is at most of 30% and thus it is impossible to use polyimide as a master material to produce a hybrid material.

Summary, preparation of low dielectric film and optical waveguide material from poly(silsesquioxane)/polyimide hybrid material has the following questions: (1) evenly dispensing of the organic into inorganic materials is difficult and thus easily results in phase separation; (2) only one of organic material and inorganic material could be used as a master material due to the limited ratio of the organic material to inorganic material.

To overcome the disadvantages of the conventional organic-inorganic material, the present inventors have investigated a process for producing a hybrid material and thus completed the present invention.

SUMMARY OF THE INVENTION

One object of the present invention provides an organic-inorganic hybrid film material consisting of polyimide and either poly(silsesquioxane) or silicon alkoxide.

DETAILED DESCRIPTION OF THE INVENTION

Figure 1:
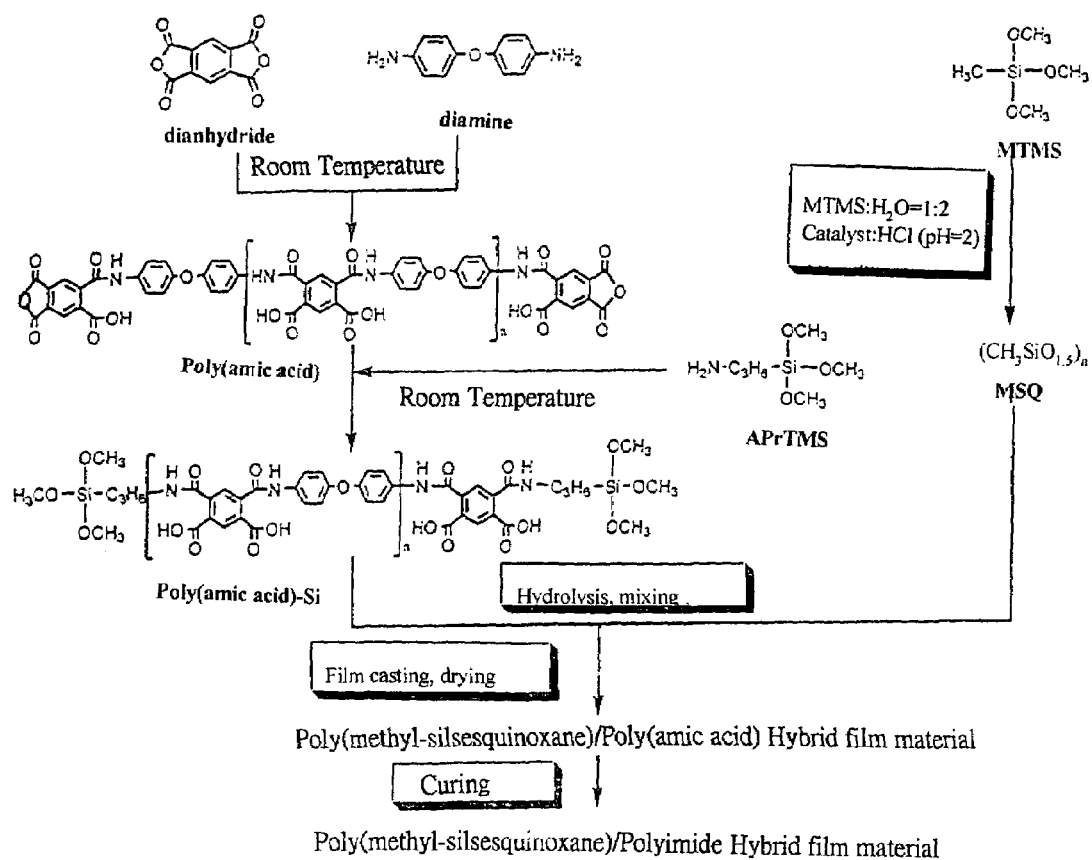
FIG. 1 shows a reaction scheme for the process for preparing an organic-inorganic hybrid film material according to the present invention from poly(amic acid) and poly(silsesquioxane)

The present invention provides a process for preparing an organic-inorganic hybrid film material, which comprises the steps of:

(a) reacting an aromatic diamine with aromatic dianhydride at a temperature of from room temperature to 50° C. to give poly(amic acid), in which an equivalent ratio of the aromatic diamine to the aromatic dianhydride is less than 2;

(b) coupling the poly(amic acid) from step (a) with an amino coupling agent having a general formula of $NH_2-R^1-Si(R^2)_3$ in which $R^1$ s a $C_{1-6}$ alkylene or phenylene group, $R^2$s are the same or different and represent $C_{1-6}$ alkoxy group, to give a poly(amic acid) terminated with the amino coupling agent, in which the equivalent of the added coupling agent is less than that of the diamine;

(c) subjecting a monomer of formula $R^3-Si(R^4)_3$ (wherein $R^3$ represents a hydrogen, $C_{1-6}$ alkyl, $C_{2-6}$ alkenyl, and phenyl, and $R^4$s are the same or different and represent a halogen, $C_{1-6}$ alkoxy, $C_{2-6}$ alkenyloxy, and phenoxy group) to sol-gel reaction in the presence of acidic catalyst in a solvent at a temperature of from room temperature to 100° C., to give poly(silsesquioxane); wherein the acidic catalyst is added in an amount sufficient to maintain a pH of the reaction mixture at a range from 1 to 4;

(d) hydrolyzing the poly(amic acid) terminated with the amino coupling agent from step (b) in the presence of deionized water and then coupling with the poly(silsesquioxane) from step (c), to give a slurry of poly(amic acid)-poly(silsesquioxane) composite material; wherein the amount of deionized water for hydrolyzing the amino coupling agent which is coupled to the poly(amic acid) is molar equivalent to or slight excess the moles of terminal alkoxy group present in the poly(amic acid) terminated with the amino coupling agent;

(e) applying the resultant composite material slurry on a substrate, curing the coated slurry at an elevated temperature to produce an organic-inorganic hybrid film material of polyimide/poly(silsesquioxane).

The present invention also relates to a process for preparing an organic-inorganic hybrid film material, which comprises the steps of:

(a1) reacting an aromatic diamine with aromatic dianhydride at a temperature of from room temperature to 50° C. to give poly(amic acid), in which an equivalent ratio of the aromatic diamine to the aromatic dianhydride is less than 2;

(b1) coupling the poly(amic acid) from step (a1) with an amino coupling agent having a general formula of $NH_2-R^1-Si(R^2)_3$ in which $R^1$ is a $C_{1-6}$ alkylene or phenylene group, $R^2$s are the same or different and represent $C_{1-6}$ alkoxy group, to give a poly(amic acid) terminated with the amino coupling agent, in which the equivalent of the added amino coupling agent is less than that of the diamine;

(d1) hydrolyzing the poly(amic acid) terminated with the amino coupling agent from step (b1) in the presence of deionized water and then coupling with silicon alkoxide, to give a slurry of poly(amic acid)-silicon alkoxide composite material; wherein the amount of deionized water for hydrolyzing the amino coupling agent which is coupled to the poly(amic acid) is molar equivalent to or slight excess the moles of terminal alkoxy group present in the poly(amic acid) terminated with the amino coupling agent;

(e1) applying the resultant composite material slurry on a substrate, curing the coated slurry at an elevated temperature to produce an organic-inorganic hybrid film material of polyimide/silicon alkoxide.

The process according to the present invention is illustrated more detail by reference to the reaction scheme shown in FIG. 1.

The term "poly(amic acid)" used herein refers to a product containing a functional groups of —NH—CO— and —COOH which are generated by reacting the diamine and the dianhydride.

The term "polyimide" used herein refers to a product obtained from curing the poly(amic acid) as defined above at an elevated temperature then cyclizing the functional group —NH—CO— with a carboxylic functional group contained in the poly(amic acid). Accordingly, the product from reacting the diamine and the dianhydride refers to "poly(amic acid)" before curing and it refers to "polyimide" after curing.

The term "$C_{1-6}$ alkyl group" used herein refers to a straight or branched chain alkyl group containing 1 to 6 carbon atoms, such as methyl, ethyl, n-propyl, isopropyl, n-butyl, s-butyl, t-butyl, n-pentyl, neopentyl, hexyl, and the like.

The term "$C_{2-6}$ alkenyl group" used herein refers to a straight or branched chain hydrocarbyl group containing 2 to 6 carbon atom and at least one carbon-carbon double bond, such as vinyl, allyl, propenyl, butenyl, pentenyl, and hexenyl, and the like.

The term "halogen" used herein refers to fluorine, chlorine, bromine, and iodide atom, preferably iodine atom.

The term "$C_{2-6}$ alkoxy group" used herein refers to the alkyl group defined as above connected via an oxygen atom, such as methoxy, ethoxy, n-propoxy, isopropoxy, n-butoxy, s-butoxy, t-butoxy, n-pentoxy, neopentoxy, hexoxy, and the like.

The term "$C_{2-6}$ alkenyl group" used herein refers to a straight or branched chain hydrocarbyl group containing 2 to 6 carbon atom and at least one carbon-carbon double bond, such as vinyl, allyl, propenyl, butenyl, pentenyl, and hexenyl, and the like.

The term "$C_{2-6}$ alkenyloxy group" used herein refers to the alkenyl group as defined above connected via an oxygen atom, such as vinyloxy, allyloxy, propenoxy, butenoxy, pentenoxy, and hexenoxy, and the like.

In the process for producing organic-inorganic hybrid film material according to the present invention, examples of the used aromatic dianhydride include, but not limit to, pyromellitic dianhydride (PMDA), 4,4-biphthalic dianhydride (BPDA), 4,4'-hexa-fluoroisopropylidene-diphthalic dianhydride (6FDA), 1-(trifluoromethyl)-2,3,5,6-benzenetetracarboxylic dianhydride (P3FDA), 1,4-di(trifluoromethyl)-2,3,5,6-benzenetetracarboxylic dianhydride (P6GDA), 1-(3',4'-dicarboxy-phenyl)-1,3,3-tri-methyl-indan-5,6-dicarboxylic dianhydride, 1-(3',4'-dicarboxy-phenyl)-1,3,3-trimethyl-indan-6,7-dicarboxylic dianhydride, 1-(3',4'-dicarboxy-phenyl)-3-methyl-indan-5,6-dicarboxylic dianhydride, 1-(3',4'-dicarboxy-phenyl)-3-methyl-indan-6,7-dicarboxylic dianhydride, 2,3,9,10-perylene-tetracarboxylic dianhydride, 1,4,5,8-naphthalene-tetracarboxylic dianhydride, 2,6-dichloro-naphthalene-1,4,5,8-tetracarboxylic dianhydride, 2,7-dichloro-naphthalene-1,4,5,8-tetracarboxylic dianhydride, 2,3,6,7-tetrachloro-naphthalene-2,4,5,8-tetracarboxylic dianhydride, phenanthrenc-1,8,9,10-tetracarboxylic dianhydride, 3,3',4'4'-benzophenone-tetracarboxylic dianhydride, 2,2',3,3'-benzophenone-tetracarboxylic dianhydride, 3,3',4',4'-biphenyl-tetracarboxylic dianhydride, 2,2',3,3'-biphenyl-tetracarboxylic dianhydride, 4,4'-isopropylidene-diphthalic anhydride, 3,3'-isopropylidene-diphthalic anhydride, 4,4'-oxy-diphthalic anhydride, 4,4'-sulfonyl-diphthalic anhydride, 3,3'-oxy-diphthalic anhydride, 4,4'-methylene-diphthalic anhydride, 4,4'-thio-diphthalic anhydride, 4,4'-ethylidene-diphthalic anhydride, 2,3,6,7-naphthalene-tetracarboxylic dianhydride, 1,2,4,5-naphthalene-tetracarboxylic dianhydride, 1,2,5,6-naphthalene-tetracarboxylic dianhydride, benzene-1,2,3,4-tetracarboxylic dianhydride, pyrazine-2,3,5,6-tetracarboxylic dianhydride, and a combination thereof. Among, pyromellitic dianhydride (PMDA), 4,4-biphthalic dianhydride (BPDA), 4,4'-hexafluoroisopropylidene-diphthalic dianhydride (6FDA), 1-(trifluoromethyl)-2,3,5,6-benzenetetracarboxylic dianhydride (P3FDA), 1,4-bis(trifluoromethyl)-2,3,5,6-benzenetetracarboxylic dianhydride (P6GDA) are preferable.

In the process for producing organic-inorganic hybrid film material according to the present invention, examples of the used aromatic diamine include, but not limit to, 4,4'-oxy-dianiline (ODA), 5-amino-1-(4'-aminophniyl)-1,3,3-trimethyl-indane; 6-amino-1-(4'-aminophenyl)-1,3,3-trimethylindane, 4,4'-methylene-bis(o-chloro-aniline), 3,3'-dichloro-dibenzidme, 3,3'-sulfonyl-dianiline, 4,4'-diamino-benzophenone, 1,5-diamino-naphthalene, bis(4-aminophenyl)diethyl silane, bis(4-aminophenyl)diphenyl silane, bis(4-aminophenyl)ethyl phosphine oxide, N-[bis(4-aminophenyl)]-N-methyl amine, N-(bis(4-aminophenyl))N-phenyl amine, 4,4'-methylene-bis(2-methyl-aniline), 4,4'-methylene-bis(2-methoxy-aniline), 5,5'-methylene-bis(2-aminophenol), 4,4'-methylene-bis(2-methyl-aniline), 4,4'-oxy-bis(2-methoxy-aniline), 4,4'-oxy-bis(2-cliloro-aniline), 2,2'-bis(4-aminophenol), 5,5'-oxy-bis(2-aminophenol), 4,4-thio-bis(2-methyl-aniime), 4,4'-thio-bis(2-methoxy-aniline), 4,4'-thio-bis(2-chloro-aniline), 4,4'-sulfonyl-bis(2-methyl-aniline), 4,4'-sulfonyl-bis(2-ethoxy-aniline), 4,4'-sulfonyl-bis(2-chloro-aniline), 5,5'-sulfonyl-bis(2-aminophenol), 3,3'-dimethyl-4,4'-diamino-benzophenone, 3,3'-dimethoxy-4,4'-diamino-benzophenone, 3,3'-dichloro-4,4'-diamino-benzophenone, 4,4'-diamino-biphenyl, m-phenylenediamine, p-phenylene-diamine, 4,4'-methylene-di-aniline, 4,4'-thio-dianiline, 4,4'-sulfonyl-dianiline, 4,4'-isopropylidene-dianiline, 3,3'-dimethyl-dibenzidine, 3,3'-dimethoxy-dibenzidine, 3,3'-dicarboxy-dibenzidine, 2,4-tolyl-diamine, 2,5-tolyl-diamine, 2,6-tolyl-diamine, m-xylyl-diamine, 2,4-diamino-5-chloro-toluene, 2,4-diamino-6-chloro-toluene, and a combination thereof. Among them, 4,4'-oxy-dianiline (ODA) is preferable.

In the process for producing organic-inorganic hybrid film material according to the present invention, examples of the used silicon alkoxide include, but not limit to, tetramethoxysilane, tetraethoxysilane, and the like.

In the process for producing organic-inorganic hybrid film material according to the present invention, the reactions in steps (a) and (a1) are preferably carried out in a solvent. The solvent can be any kind of solvent as long as it is inert to the reaction. Examples of the solvent include, but not limit to, N,N-dimethylacetamide (DMAc), 1-methylpyrrolidone (NMP), N,N-dimethylformamide (DMF), tetrahydrofuran (THF), dioxane, methyl ethyl ketone (MEK), chloroform, methylene chloride, and the like.

In the process for producing organic-inorganic hybrid film material according to the present invention, examples of the amino coupling agent of formula $NH_2—R^1—Si(R^2)_3$ used in steps (b) and (b1) include, but not limit to, 3-aminopropyl trimethoxy silane (APrTMS), 3-aminopropyl triethyl silane (APrTES), 3-aminophenyl trimethoxy silane (APTMS), 3-aminophenyl triethoxy silane (APTES), and the like.

In the process for producing organic-inorganic hybrid film material according to the present invention, examples of monomer of formula $R^3—Si(R^4)_3$ used in step (s) for preparing poly(silsesquioxane) include, but not limit to, methyl trimethoxy silane (MTMS), trimethoxy silane (TMS), triethoxy silane (TES), methyl triethoxy silane (MTES), phenyl trimethoxy silane (PTMS), phenyl triethoxy silane (PTES), vinyl trimethoxy silane (VTMS), vinyl triethoxy silane (VTES), trichlorosilane, methyl trichloro silane, phenyl trichloro silane, vinyl trichloro silane, and the like.

The catalyst used in step (c) of the process of the present invention can use organic acid and inorganic acid. Examples of the organic acid include, but not limit to, hydrochloric acid, sulfuric acid, nitric acid, phosphoric acid, and the like. Examples of the inorganic acid include, but not limit to, formic acid, acetic acid, propionic acid, oxalic acid, malonic acid, succinic acid, glutaric acid, glycolic acid, tartaric acid, and the like.

The solvent used in step (c) of the process of the present invention can use any kind of solvent as long as it is inert to the reaction. Examples of the solvent include, but not limit to, N,N-dimethylacetamide (DMAc), 1-methylpyrrolidone (NMP), N,N-dimethylformamide (DMF), tetrahydrofuran (THF), dioxane, methyl ethyl ketone (MEK), chloroform, methylene chloride, and the like. Among them, N,N-dimethylacetamide (DMAc) is preferable.

The process for producing organic-inorganic hybrid film material according to the present invention further comprises a step of distillating the poly(silsesquioxane) at reduced pressure to remove byproduct methanol after step (c). The distillation is preferably carried out at a temperature of from 40 to 45° C. If the distillation temperature is too high, the reaction will be continued. If the temperature is too low, it is insufficient to distillate methanol off thoroughly. After the distillation step, the solvent used in the reaction can be further added into the distillated mixture to adjust its solid content to from 10 to 20% by weight.

After the step (c), if the byproduct methanol is not distillated off, the poly(silsesquioxane) should be used in an amount of only up to 30% by weight, otherwise the poly(amic acid) will precipitate out.

In the steps (d) and (d1) of the process according to the present invention, the poly(silsesquioxane) or the silicon alkoxide can be mixed with the poly(amic acid) in any ratio. All ratios will not cause the mixture precipitation or turbidity.

In the steps (e) and (e1) of the process according to the present invention, applying the composite material slurry on a substrate can be conducted by any coating method well known in this art, including rolling coating method, flow coating method, dip coating method, spray coating method, spin coating method, curtain coating method, and the like. For obtaining an even film, the spin coating method is preferable.

In the steps (e) and (e1) of the process according to the present invention, curing the coated slurry at an elevated temperature is conveniently conducted by a baking method, preferably by a multi-stage baking method at a gradient elevated temperature. By the multi-stage baking method, the solvent contained in the coated slurry will be evaporated slowly to avoid the crack of a film. The multi-stage baking method includes, but not limit to, baking the coated slurry at a temperature of 50 to 70° C. for 15 to 25 minutes form a film, then baking the film at a temperature of 90 to 110° C. for 15 to 25 minutes, then baking it at a temperature of 140 to 160° C. for 15 to 25 minutes, then curing it in an oven at a temperature of 290 to 310° C. under a nitrogen atmosphere for several hours, and finally curing it at a temperature of 390 to 420° C. for several hours.

The present invention will be illustrated by reference to the following examples. However, the examples are only for illustration purpose without limiting the scope of the present invention.

EXAMPLE 1

Preparation of poly(amic) having a theoretical molecular weight of 5000 gram/mole. 0.686 Grams of 4,4'-oxy-dianiline (ODA) were dissolved in 8.5 g of N,N-dimethulacetamide (DMAc) and stirred for 20 minutes. Then 0.814 g of pyromellitic dianhydride (PMDA) were added slowly and stirred for 4 hours at room temperature. Then 0.107 g of 3-aminopropyl trimethoxy silane (APrTMS) were added. A mole ratio of PMDA:ODA:APrTMS was 12.4:11.4:2. After the addition of APrTMS, the reaction was carried out for further 20 minutes to obtain poly(amic acid) solution (A).

Preparation of poly(methyl-silsesquioxane) solution. A three-neck bottle equipped with a condenser and a nitrogen inlet was charged with 10.17 g of methyl trimethoxy silane (MTMS) monomer, then charged with 30 g of N,N-dimethyl-acetamide (DMAc). The mixture was heated reflux in a silicone oil bath under nitrogen atmosphere. Separately, 7.14 g of DMAc, 2.687 g of deionized water, and 0.055 g of 35% aqueous hydrochloric acid solution were charged into a funnel at a constant pressure. The mixture was added dropwise into the above three-neck bottle over 30 minutes. The reaction was continued for 3 hours. The resultant solution was concentrated by a rotary evaporator at a temperature of 40° C. in vacuum to remove byproduct methanol and part of used solvent to obtain a mixture having a solid content of 30%. Then the solid content of the mixture was adjusted to 15% by adding DMAc to obtain poly(methyl-silsesquioxane) solution (C).

Sol-gel reaction of poly(methyl-silsesquioxane) solution and poly(amic acid). Into a mixture of 1 g of poly(methyl-silsesquioxane) solution (C) and 9 g of poly(amic acid) (A) was added 0.039 g of deionized water and the mixture was stirred at room temperature for 1 hour to hydrolyze the terminal alkoxysilyl group contained in the poly(amic acid). It resulted a hybrid solution of poly(methyl-silsesquioxane)-poly(amic acid) in which the amount of poly(methyl-silsesquioxane) is 10% by weight base on the total weight of poly(methyl-silsesquioxane) and poly(amic acid).

The resultant hybrid solution was spin coated on a 4" silicon wafer at 3000 rpm for 60 seconds to form a film, then baked it on a hot plate on the following schedule: 60° C. for 20 minutes, 100° C. for 20 minutes, 150° C. for 20 minutes. Then the baked film was transferred into an oven at a temperature of 300° C. under a nitrogen atmosphere then cured for 1 hour. Finally, the film was further cured in the oven for 1 hour by increasing the temperature from 300° C. to 400° C. to obtained a poly(methyl-silsesquioxane)-polyimide hybrid film.

EXAMPLES 2 TO 8

Examples 2 to 8 followed the procedures as mentioned in Example 1 except the weight ratio of the poly(methyl-silsesquioxane) was changed to 0%, 20%, 40%, 60%, 80%, 100%, and 100%, respectively. Also, the film obtained from Example 8 was only subjected to baking on hot plate without curing in oven.

EXAMPLE 9

Preparation of poly(amic) having a theoretical molecular weight of 1000 gram/mole. 0.569 Grams of 4,4'-oxy-dianiline (ODA) were dissolved in 8.5 g of N,N-dimethulacetamide (DMAc) and stirred for 20 minutes. Then 0I931 g of pryomellitic dianhydride (PMDA) were added slowly and stirred for 4 hours at room temperature. Then 0.509 g of 3-aminopropyl trimethoxy silane (APrTMS) were added. A mole ratio of PMDA:ODA:APrTMS was 3:2:2. After addition of APrTMS, the reaction was carried out for further 20 minutes to obtain poly(amic acid) solution (B).

The resultant hybrid solution was spin coated on a 4" silicon wafer at 3000 rpm for 60 seconds to form a film, then baked it on a hot plate on the following schedule: 60° C. for 20 minutes, 100° C. for 20 minutes, 150° C. for 20 minutes.

Then the baked film was transferred into an oven at a temperature of 300° C. under a nitrogen atmosphere then cured for 1 hour. Finally, the film was further cured in the oven for 1 hour by increasing the temperature from 300° C. to 400° C. to obtained a poly(methyl-silsesquioxane)-polyimide hybrid film.

EXAMPLE 10

Preparation of poly(amic) having a theoretical molecular weight of 1000 gram/mole. 4.10 Grams of 4,4'-oxy-dianiline (ODA) were dissolved in 62.2 g of N,N-dimethylacetamide (DMAc) and stirred for 20 minutes. Then 9.12 g of 4,4-biphthalic dianhydride (BPDA) were added slowly and stirred for 4 hours at room temperature. Then 3.68 g of 3-aminopropyl trimethoxy silane (APrTMS) were added. A mole ratio of BPDA:ODA:APrTMS was 3:2:2. After addition of APrTMS, the reaction was carried out for further 20 minutes to obtain a solution (D) of 13.6 g of poly(amic acid) in 62.2 g of N,N-dimethylacetamide.

Sol-gel reaction of silicon alkoxide solution and poly (amic acid). Into the solution (D) of 13.6 g of poly(amic acid) in 62.2 g of N,N-dimethylacetamide was added 15.5 g of tetramethoxysilane (TMOS) and then added 8.3 g of deionized water and the mixture was stirred at room temperature for 1 hour to hydrolyze the terminal alkoxysilyl group contained in the poly(amic acid). It resulted in a solution of silicon alkoxide-poly(amic acid) hybrid material.

The resultant hybrid solution was spin coated on a 4" silicon wafer at 3000 rpm for 60 seconds to form a film, then baked it on a hot plate on the following schedule: 60° C. for 20 minutes, 100° C. for. 20 minutes, 150° C. for 20 minutes. Then the baked film was transferred into an oven at a temperature of 300° C. under a nitrogen atmosphere then cured for 1 hour. Finally, the film was further cured in the oven for 1 hour by increasing the temperature from 300° C. to 400° C. to obtained a silicon alkoxide-polyimide hybrid film.

The film material obtained from Examples 1 to 10 were analyzed their properties. For example, their FT-IR spectrum, AFM (Atomic Force Microscopic) spectrum, SEM, roughness, refractive index, birefractive index, near-IR spectrum, dielectric constant, TGA spectrum, pyrolysis temperature, and thermeanalysis are shown in FIGS. 2 to 12, respectively.

Figure 2:
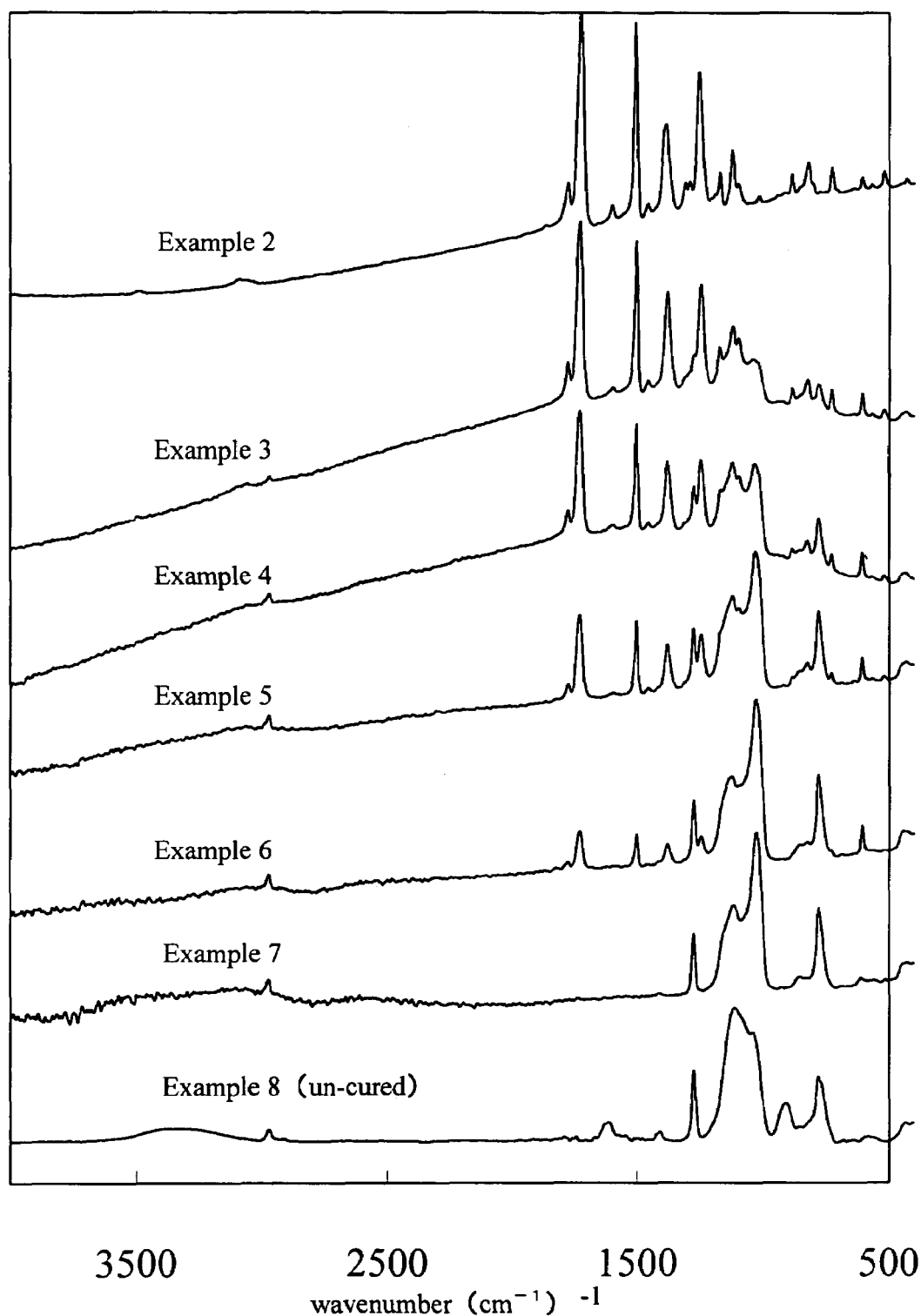
FIG. 2 shows a FT-IR spectrum of the organic-inorganic hybrid film prepared from Examples 2 to 8.
Figure 3:
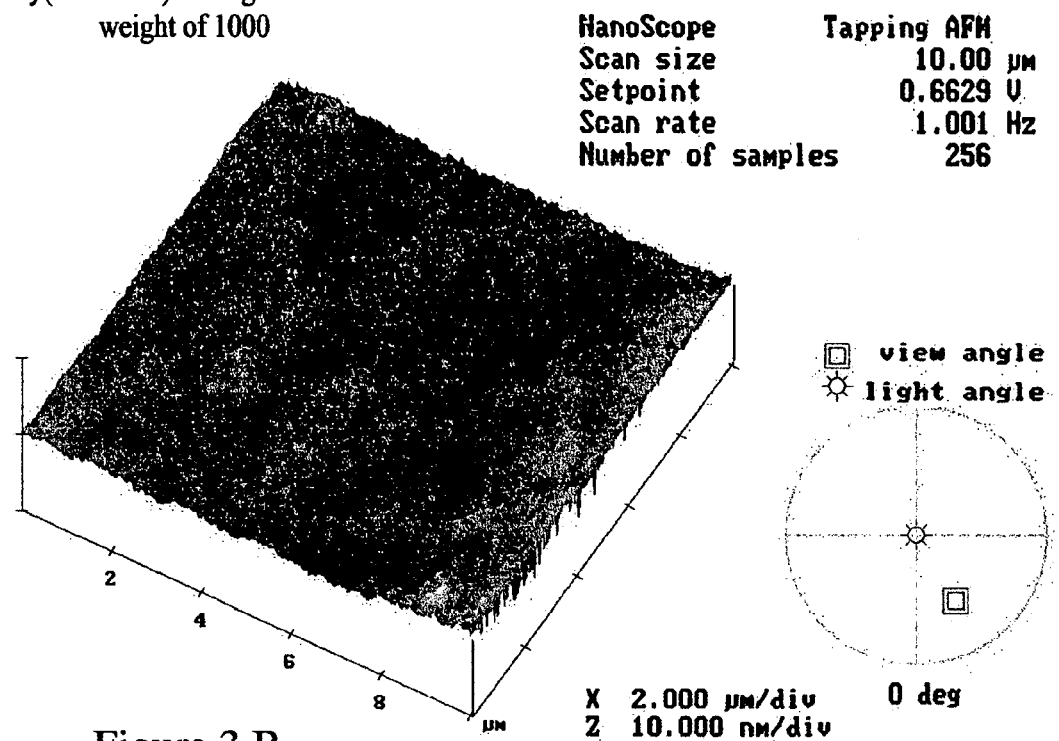
FIG. 3 shows a AFM(Atomic Force Microscopic) spectrum of an organic-inorganic hybrid film prepared from 60% by weight of poly(methyl-silsesquioxane) and 40% by weight of poly(amic acid)
Figure 3:
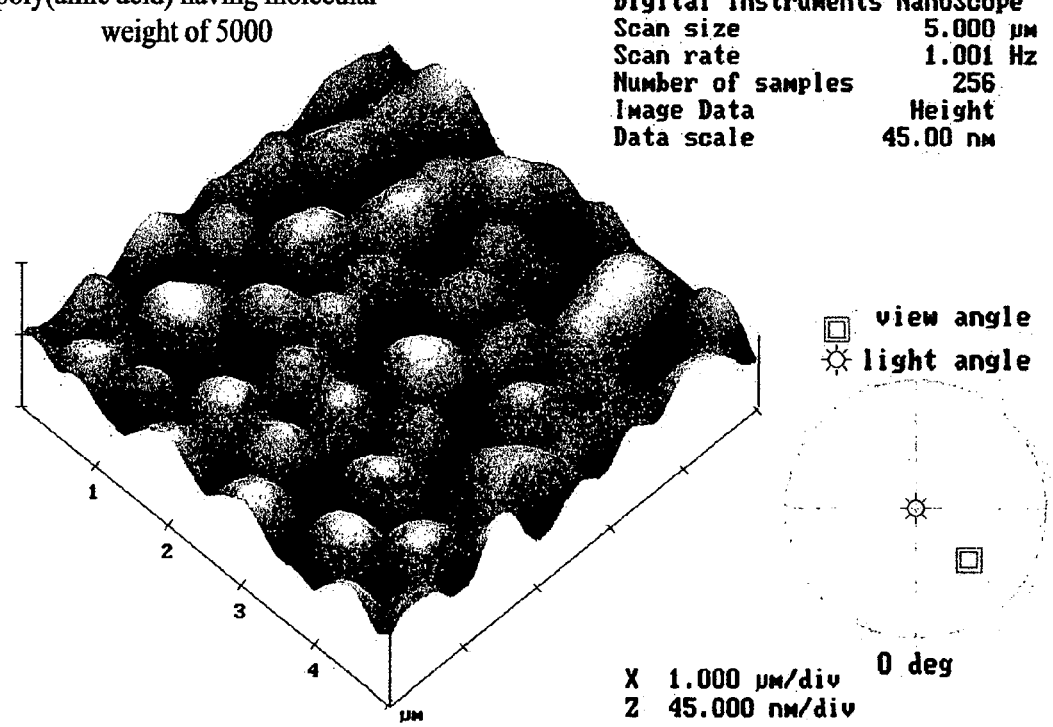
Figure 3:
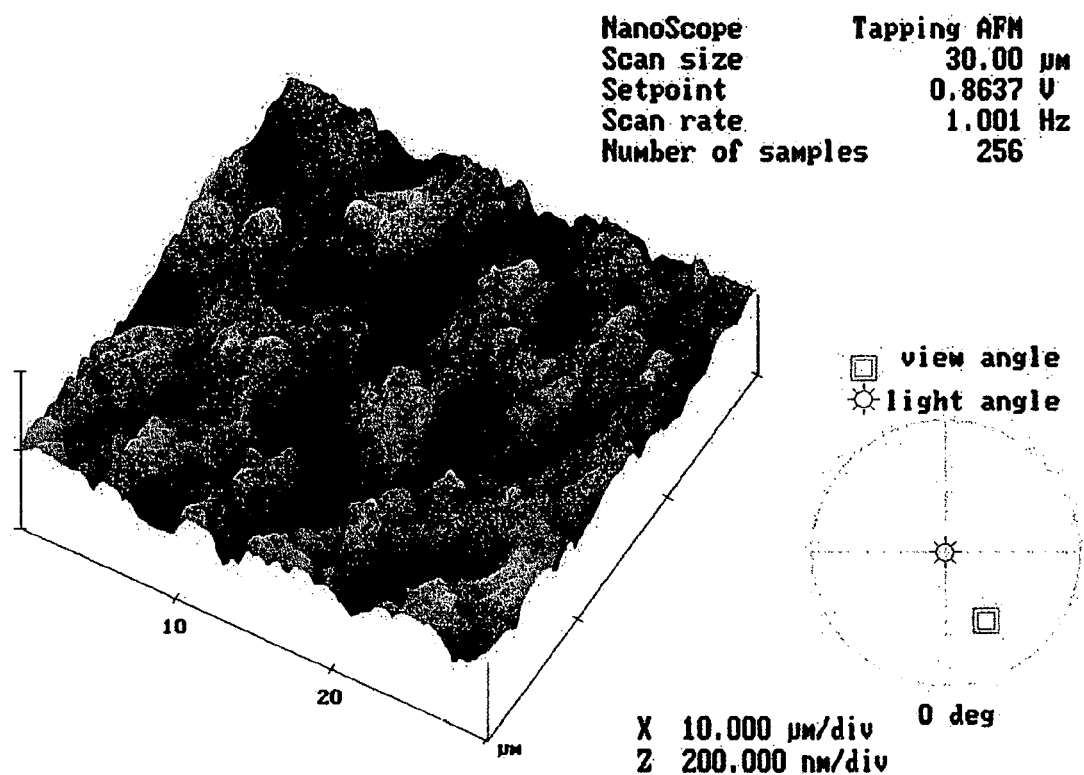
Figure 4:
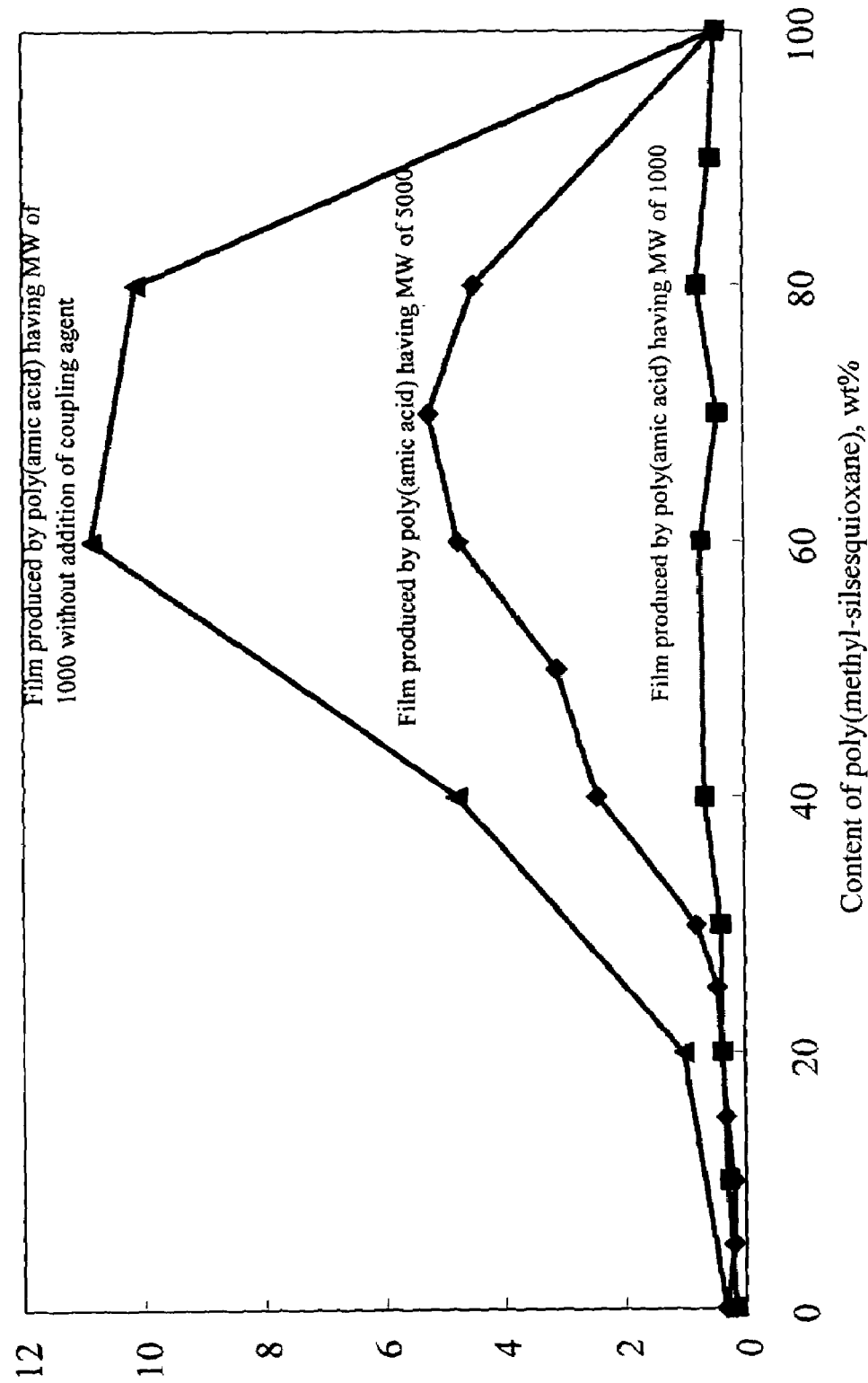
FIG. 4 shows a plot of roughness of the hybrid film vs. content of poly(methyl-silsesquioxane)
Figure 5:
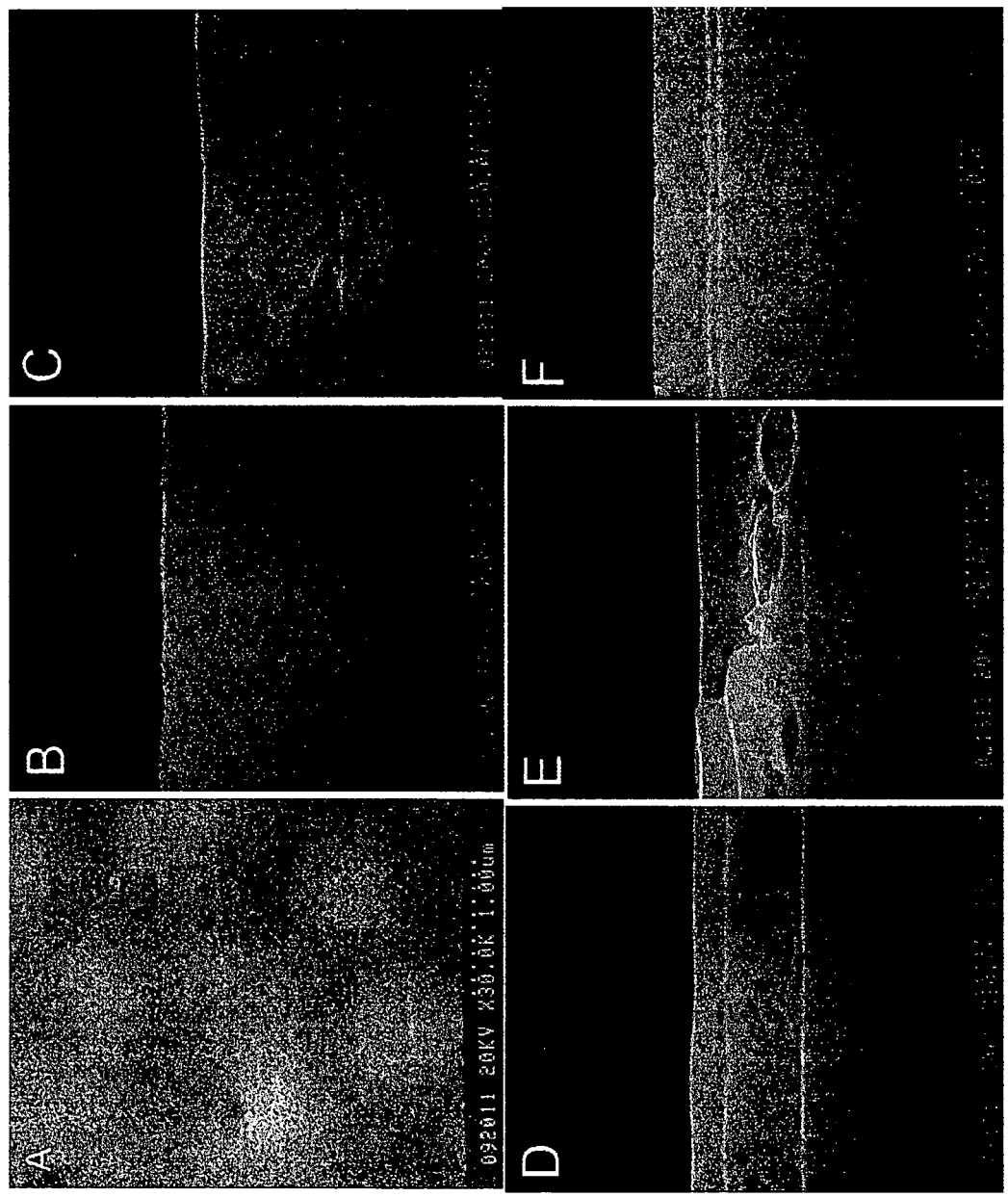
FIG. 5 shows surface and cross-section SEM graph of the organic-inorganic hybrid film prepared by the process according to the present invention.
Figure 6:
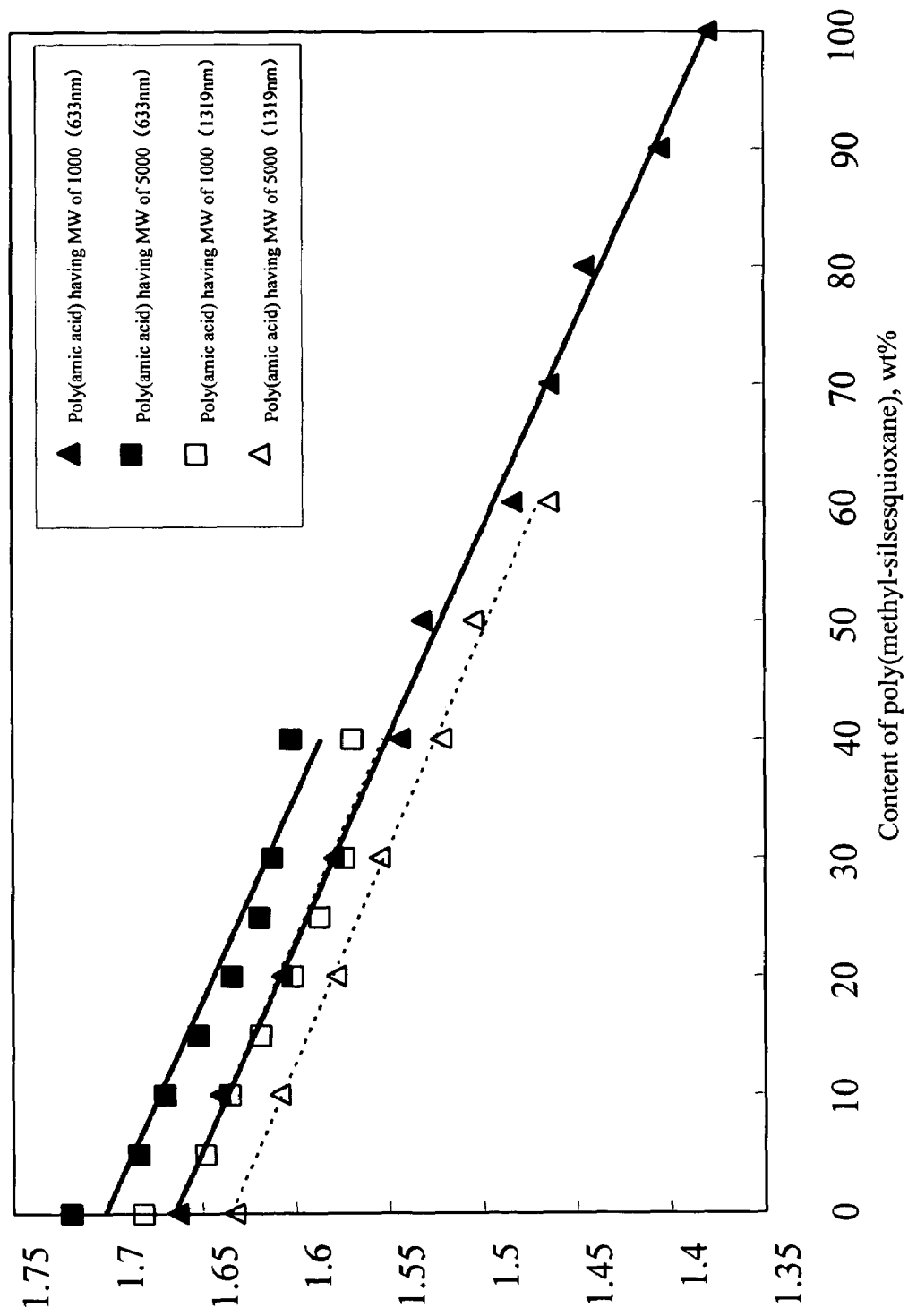
FIG. 6 shows a plot graph of refractive index of the hybrid film vs. the content of poly(methyl-silsesquioxane) at different wavelength.
Figure 7:
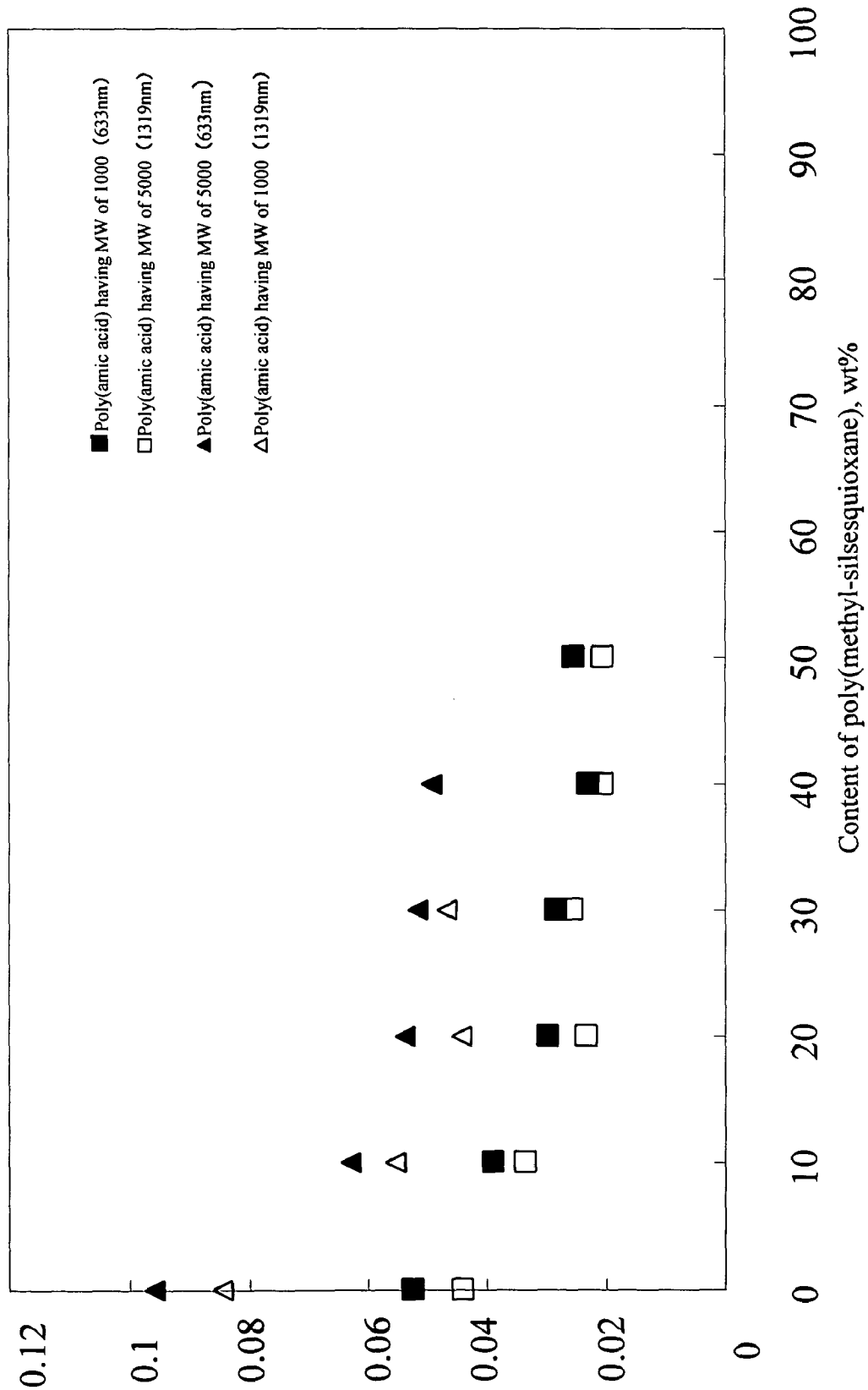
FIG. 7 shows a plot graph of birefractive index of the hybrid film vs. the content of poly(methyl-silsesquioxane) at different wavelength.
Figure 8:
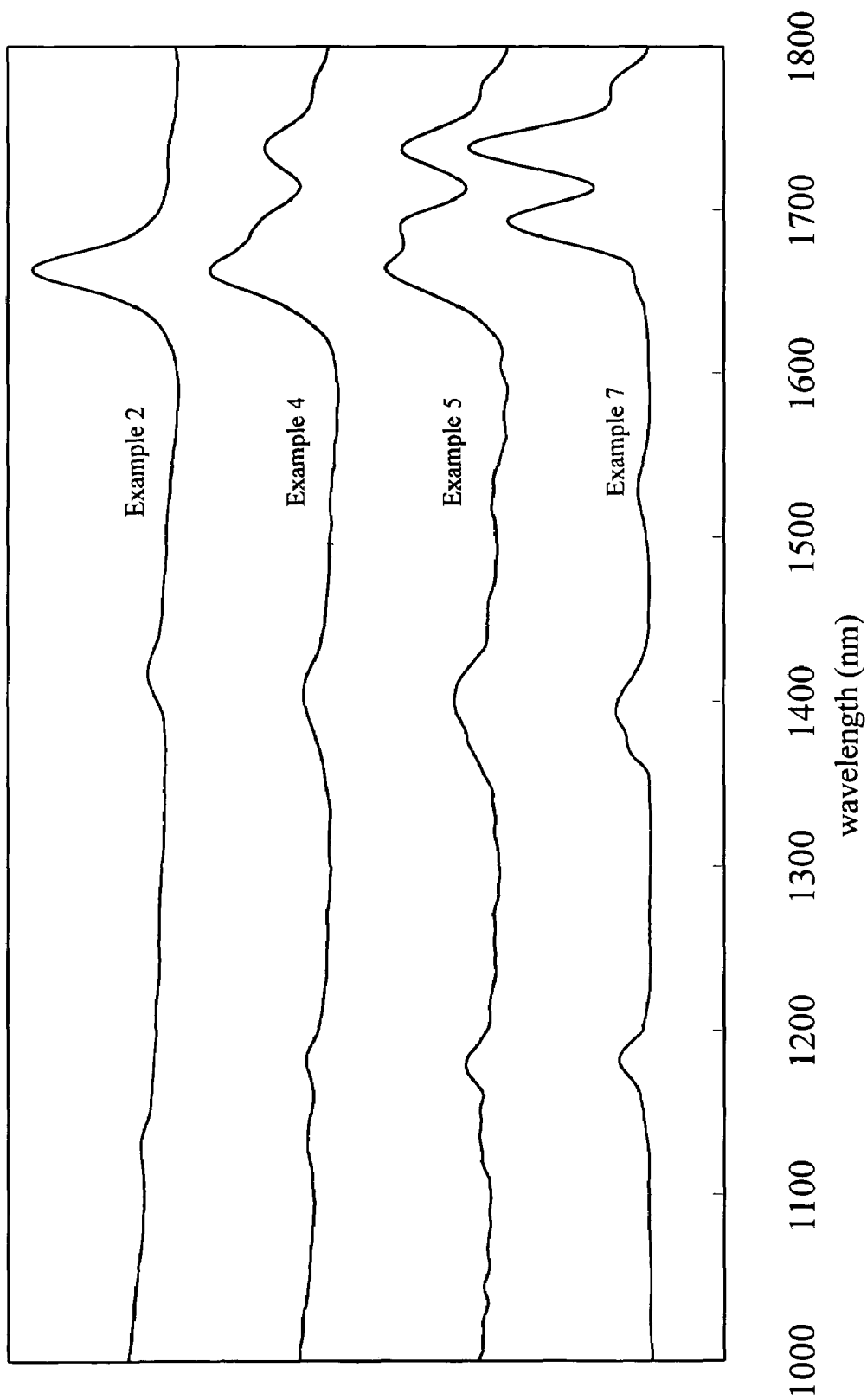
FIG. 8 shows a near-IR absorption spectrum of the organic-inorganic hybrid film prepared by the process according to the present invention.
Figure 9:
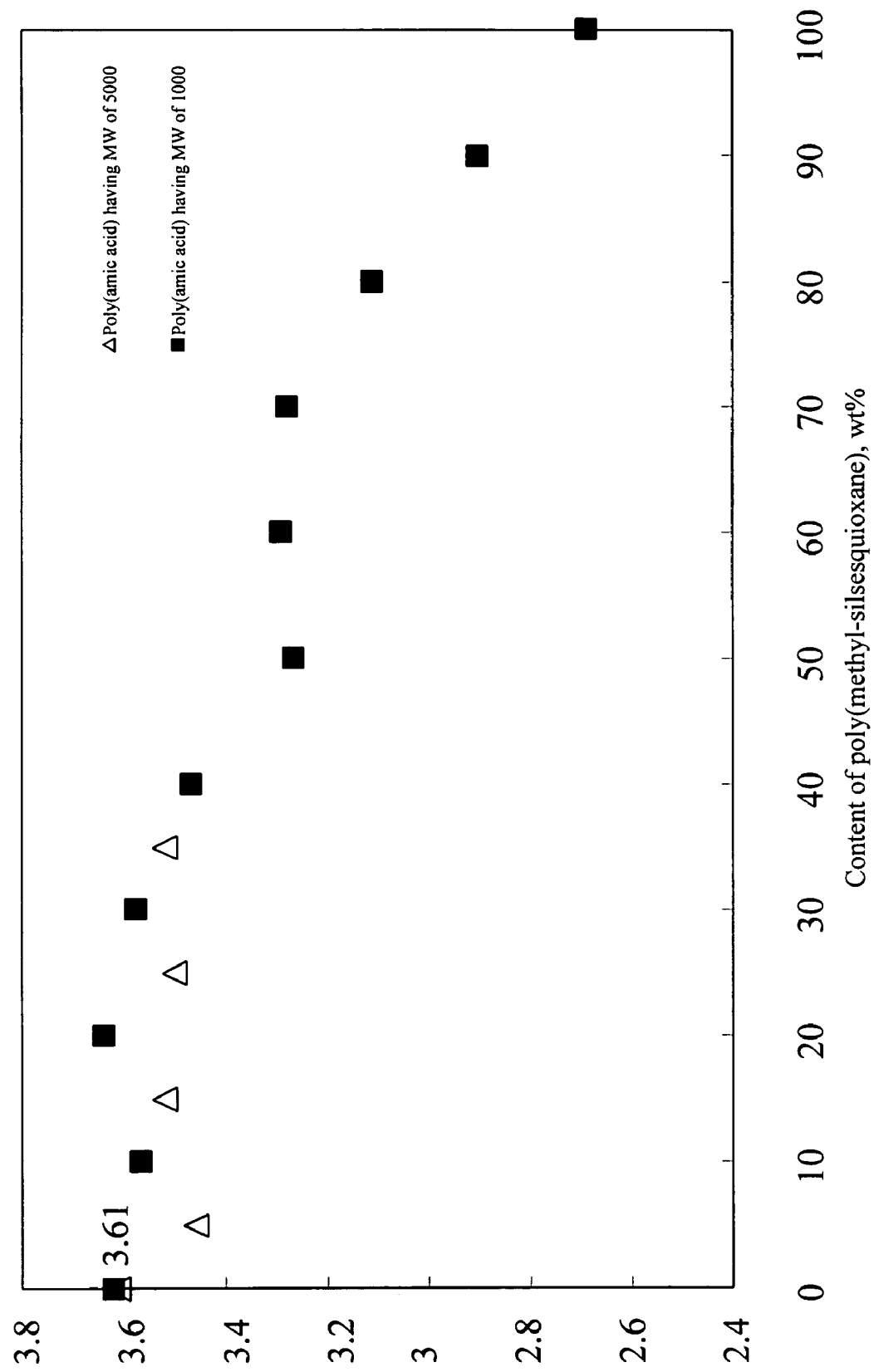
FIG. 9 shows a plot graph of dielectric index of the hybrid film vs. the content of poly(methyl-silsesquioxane)
Figure 10:
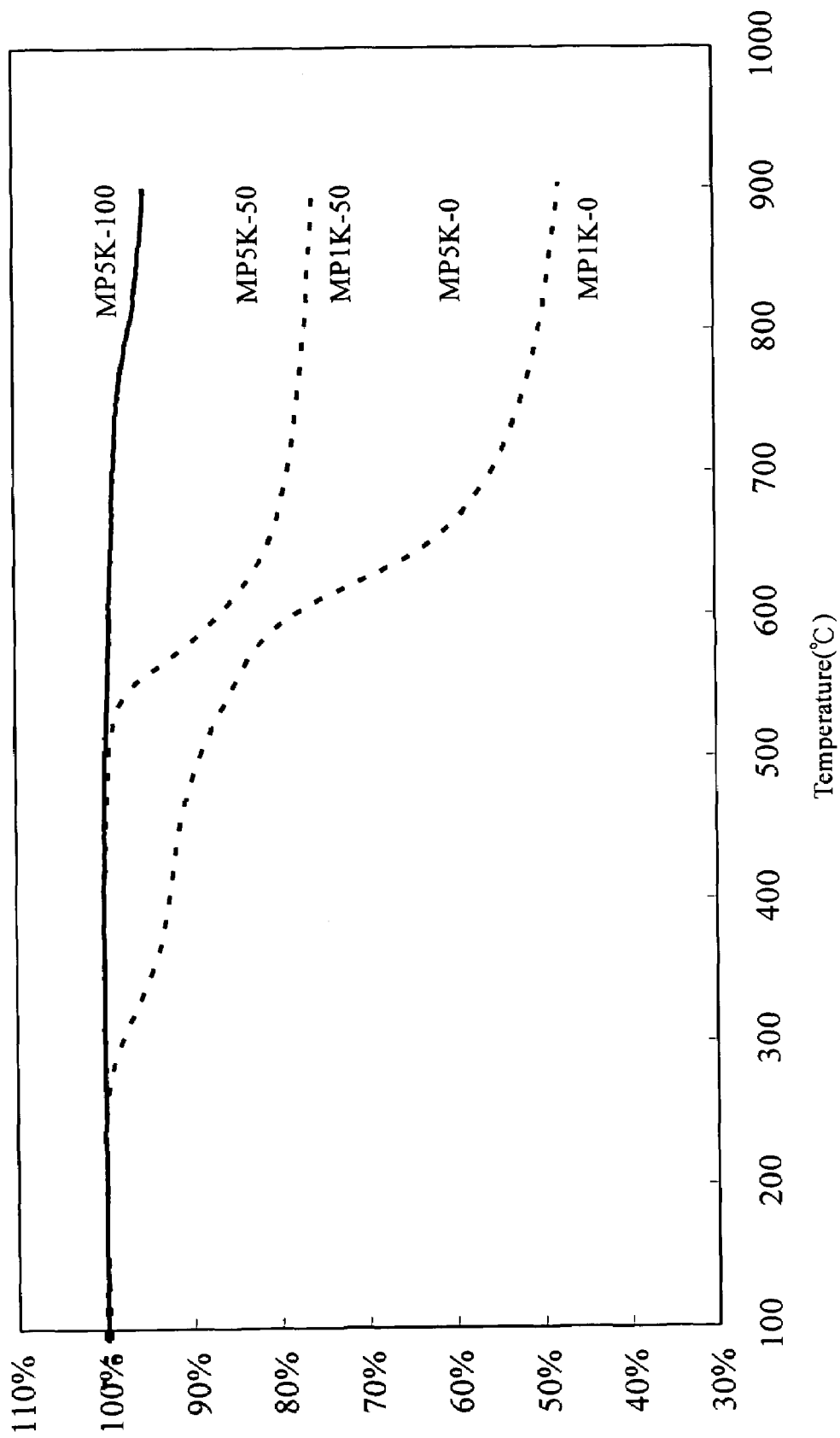
FIG. 10 shows a TGA graph of the organic-inorganic hybrid film prepared by the process according to the present invention.
Figure 11:
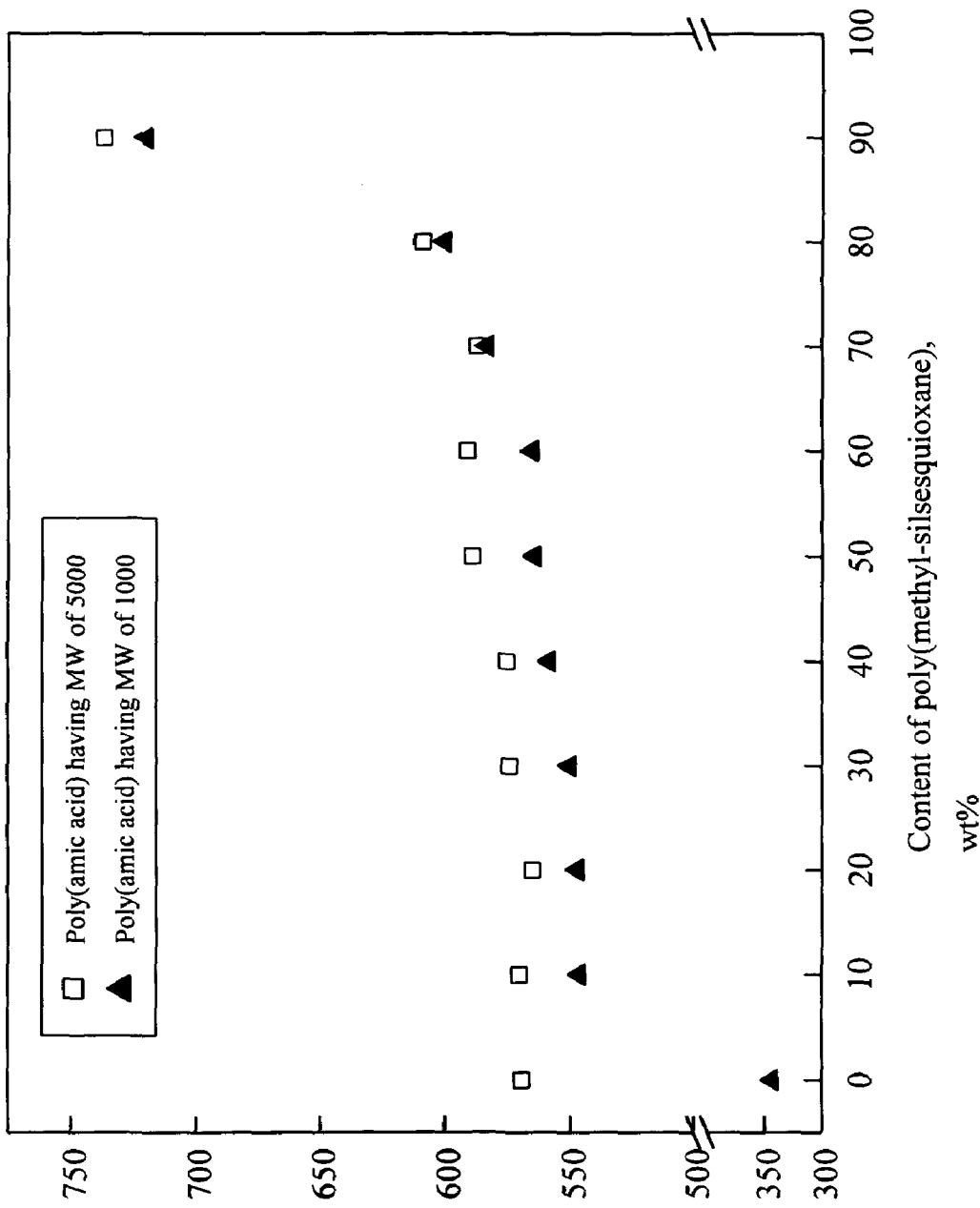
FIG. 11 shows a plot graph of pyrolysis temperature of the hybrid film vs. the content of poly(methyl-silsesquioxane)
Figure 12:
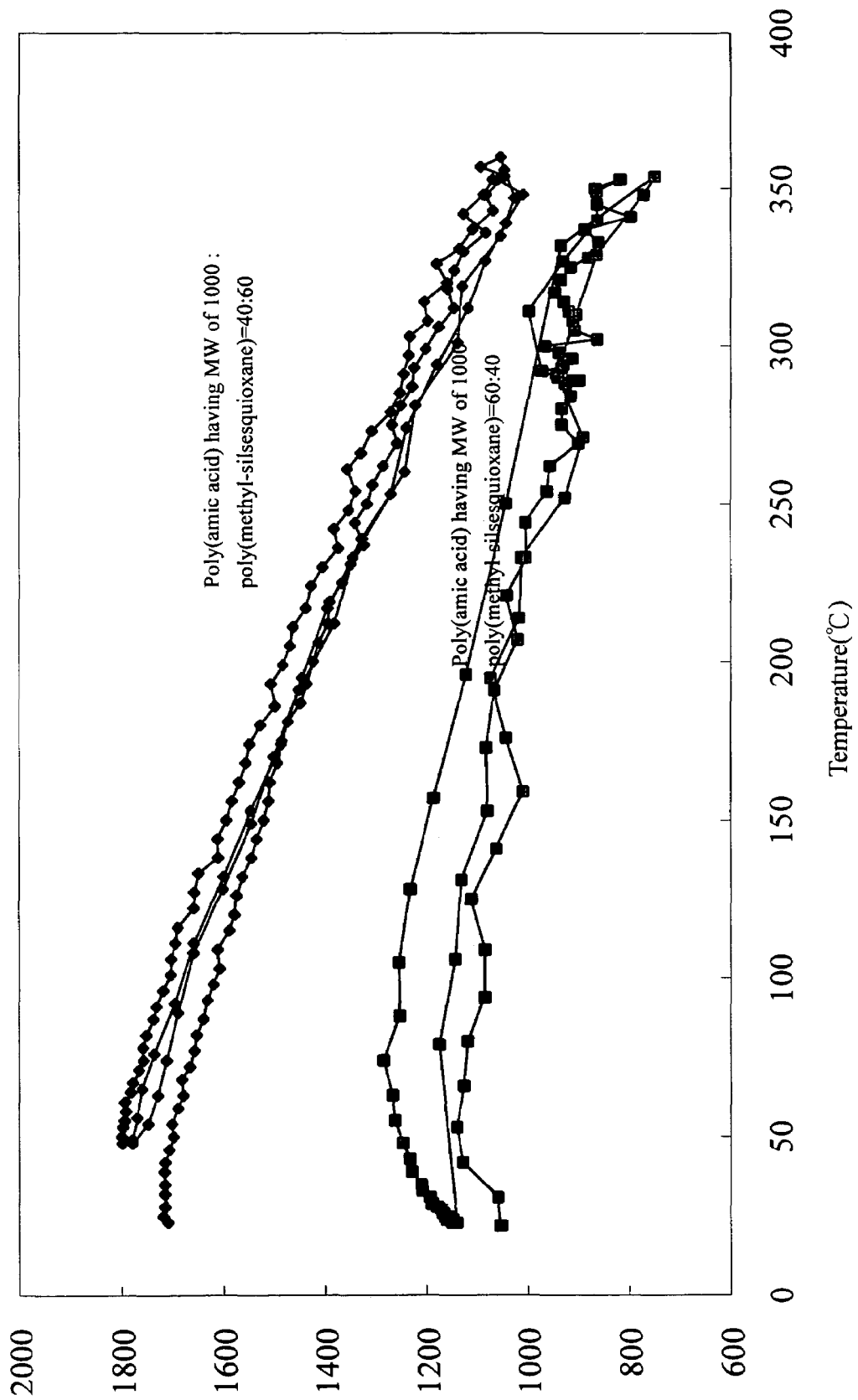
FIG. 12 shows a thermo-stress graph of the organic-inorganic hybrid film prepared by the process according to the present invention.

From the FT-IR spectrum shown in FIG. 2, it is found that poly(methyl-silsesquioxane) or silicon alkoxide has been completely reacted, and each peak area varies with its content. From the AFM spectrum shown in FIG. 3, it is found that polyimide having lower molecular weight has a better surface flatness, in which FIG. 3(a) shows a poly(amic acid) having molecular weight of 1000, FIG. 3(B) shows a poly(amic acid) having molecular weight of 5000, FIG. 3(c)) shows a poly(amic acid) having molecular weight of 1000 without addition of coupling agent. FIG. 4 shows a plot of roughness of films vs. poly(methyl-silsesquioxane) content. From FIG. 4, it is know that hybrid film obtained from poly(amic acid) having lower molecular weight has an average roughness of less than 1 nm, and the film obtained without using coupling agent exhibits the largest roughness. From SEM spectrum shown in FIG. 5, it is known that a hybrid film prepared from poly(amic acid) having higher molecular weight significantly occurs phase-separation in case of reacting with high content of poly(silsesquioxane). It demonstrates that increasing of crosslinking density actually decreases the phase-separation. From FIG. 6, it is shown that the refractive index can be controlled by changing the weight ratio of poly(amic acid) to poly(silsesquioxane). From FIG. 7, it is shown that bi-refractive index will be decreased since addition of inorganic material destroys the arrangement of high molecular. Thus, bi-refractive index decreases slightly with the increase amount of inorganic material. FIG. 8 shows a near IR spectrum of the hybrid film of the present invention. The hybrid film of the present invention shows no absorbance in a frequence range use din ooptical waveguide and is useful as optical waveguide material. From FIG. 9, it is shown that a plot of dielectric index vs. content of poly(methyl-silsesquioxane) of the hybrid film is non-linear graph due to its hygroscopic property and film thickness and the dielectric index decreases with increase of inorganic material. From FIG. 10, it is shown that addition of inorganic material will increase the heat-resistance of the hybrid film, and the film prepared from poly(amic acid) having higher molecular weight exhibits better heat-resistance than that prepared from poly(amic acid) having lower molecular weight. From FIG. 11, it is shown that all hybrid films of the present invention have a pyrolysis temperature of more than 545° C. It demonstrates that the hybrid film of the present invention possesses excellent heat-resistance. Also, a DSC analysis for the hybrid film of the present invention shows no glass transition temperature. Finally, from FIG. 12, it is shown that addition of inorganic material will increase stability of the hybrid film.

What is claimed is:

1. A process for preparing an organic-inorganic hybrid film material, which comprises the steps of:
   (a) reacting an aromatic diamine with aromatic dianhydride at a temperature of from room temperature to 50° C. to give poly(amic acid), in which an equivalent ratio of the aromatic diamine to the aromatic dianhydride is less than 2;
   (b) coupling the poly(amic acid) from step (a) with an amino coupling agent having a general formula of $NH_2-R^1-Si(R^2)_3$, in which $R^1$ is a $C_{1-6}$ alkylene or phenylene group, $R^2$s are the same or different and represent $C_{1-6}$ alkoxy group, to give a poly(amic acid) terminated with the amino coupling agent, in which the equivalent of the added coupling agent is less than that of the diamine;
   (c) subjecting a monomer of formula $R^3-Si(R^4)_3$ (wherein $R^3$ represents a hydrogen, $C_{1-6}$ alkyl, $C_{2-6}$ alkenyl, and phenyl, and $R^4$s are the same or different and represent a halogen, $C_{1-6}$ alkoxy, $C_{2-6}$ alkenyloxy, and phenoxy group) to sol-gel reaction in the presence of acidic catalyst in a solvent at a temperature of from room temperature to 100° C., to give poly(silsesquioxane); wherein the acidic catalyst is added in an amount sufficient to maintain a pH of the reaction mixture at a range from 1 to 4;
   (d) hydrolyzing the poly(amic acid) terminated with the amino coupling agent from step (b) in the presence of deionized water and then coupling with the poly(silsesquioxane) from step (c), to give a slurry of poly(amic acid)-poly(silsesquioxane) composite material; wherein the amount of deionized water for hydrolyzing the amino coupling agent which is coupled to the poly(amic acid) is molar equivalent to or slight excess the moles of terminal alkoxy group present in the poly(amic acid) terminated with the amino coupling agent;
   (e) applying the resultant composite material slurry on a substrate, curing the coated slurry at an elevated temperature to produce an organic-inorganic hybrid film material of polyimide/poly(silsesquioxane).

2. The process according to claim 1, which further comprises a step of distillating the poly(silsesquioxane) at reduced pressure to remove byproduct methanol after step (c).

3. The process according to claim 1, wherein said aromatic dianhydride is selected from the group consisting of pyromellitic dianhydride (PMDA), 4,4-biphthalic dianhydride (BPDA), 4,4hexa-fluoroisopropylidene-diphthalic dianhydride (6FDA), 1-(trifluoromethyl)-2,3,5,6-benzenetetracarboxylic dianhydride (P3FDA), 1,4-di(trifluoromethyl)-2,3,5,6-benzenetetracarboxylic dianhydride (P6GDA), 1-(3',4'-dicarboxy-phenyl)-1,3,3-tri-methyl-indan-5,6-dicarboxylic dianhydride, 1-(3',4'-dicarboxy-phenyl)-1,3,3-trimethyl-indan-6,7-dicarboxylic dianhydride, 1l-(3',4'-dicarboxy-phenyl)-3-methyl-indan-5,6-dicarboxylic dianhydride, 1-(3',4'-dicarboxy-phenyl)-3-methyl-indan-6,7-dicarboxylic dianhydride, 2,3,9,10-perylene-tetracarboxylic dianhydride, 1,4,5,8-naphthalene-tetracarboxylic dianhydride, 2,6-dichloro-naphthalene-1,4,5,8-tetracarboxylic dianhydride, 2,7-dichloro-naphthalene-1,4,5,8-tetracarboxylic dianhydride, 2,3,6,7-tetrachloro-naphthalene-2,4,5,8-tetracarboxylic dianhydride, phenanthrenc-1,8,9,10-tetracarboxylic dianhydride, 3,3',4'4'-benzophenone-tetracarboxylic dianhydride, 2,2',3,3'-benzophenone-tetracarboxylic dianhydride, 3,3',4',4'-biphenyl-tetracarboxylic dianhydride, 2,2',3,3'-biphenyl-tetracarboxylic dianhydride, 4,4'-isopropylidene-diphthalic anhydride, 3,3'-isopropylidene-diphthalic anhydride, 4,4'-oxy-diphthalic anhydride, 4,4'-sulfonyl-diphthalic anhydride, 3,3'-oxy-diphthalic anhydride, 4,4'-methylene-diphthalic anhydride, 4,4'-thio-diphthalic anhydride, 4,4'-ethylidene-diphthalic anhydride, 2,3,6,7-naphthalene-tetracarboxylic dianhydride, 1,2,4,5-naphthalene-tetracarboxylic dianhydride, 1,2,5,6-naphthalene-tetracarboxylic dianhydride, benzene-1,2,3,4-tetracarboxylic dianhydride, pyrazine-2,3,5,6-tetracarboxylic dianhydride, and a combination thereof.

4. The process according to claim 1, wherein said aromatic diamine is selected from the group consisting of 4,4'-oxy-dianiline (ODA), 5-amino-1-(4'-aminophniyl)-1,3,3-trimethyl-indane; 6-amino-1-(4'-aminophenyl)-1,3,3-tri-methyl-indane, 4,4'-methylene-bis(o-chloro-aniline), 3,3'-dichloro-dibenzidme,3,3'-sulfonyl-dianiline, 4,4'-diamino-benzophenone, 1,5-diamino-naphthalene, bis(4-aminophenyl)diethyl silane, bis(4-aminophenyl)diphenyl silane, bis(4-aminophenyl)ethyl phosphine oxide, N-[bis(4-aminophenyl)]-N-methyl amine, N-(bis(4-aminophenyl))N-phenyl amine, 4,4'-methylene-bis(2-methyl-aniline), 4,4'-methylene-bis(2-methoxy-aniline), 5,5'-methylene-bis(2-aminophenol), 4,4'-methylene-bis(2-methyl-aniline), 4,4'-oxy-bis(2-methoxy-aniline), 4,4'-oxy-bis(2-cliloro-aniline), 2,2'-bis(4-aminophenol), 5,5'-oxy-bis(2-aminophenol), 4,4'-thio-bis(2-methyl-aniime), 4,4'-thio-bis(2-methoxy-aniline), 4,4'-thio-bis(2-chloro-aniline), 4,4'-sulfonyl-bis(2-methyl-aniline), 4,4'-sulfonyl-bis(2-ethoxy-aniline), 4,4'-sulfonyl-bis(2-chloro-aniline), 5,5'-sulfonyl-bis(2-aminophenol), 3,3'-dimethyl-4,4'-diamino-benzophenone, 3,3'-dimethoxy-4,4'-diamino-benzophenone,3,3'-dichloro-4,4'-diamino-benzophenone, 4,4'-diamino-biphenyl, m-phenylenediamine, p-phenylene-diamine, 4,4'-methylene-dianiline, 4,4'-thio-dianiline, 4,4'-sulfonyl-dianiline, 4,4'-isopropylidene-dianiline, 3,3'-dimethyl-dibenzidine, 3,3'-dimethoxy-dibenzidine, 3,3'-dicarboxy-dibenzidine, 2,4-tolyl-diamine, 2,5-tolyl-diamine, 2,6-tolyl-diamine, m-xylyl-diamine, 2,4-diamino-5-chloro-toluene, 2,4-diamino-6-chloro-toluene, and a combination thereof.

5. The process according to claim 1, wherein said amino coupling agent of formula $NH_2—R^1—Si(R^2)_3$ is selected from the group consisting of 3-aminopropyl trimethoxy silane (APrTMS), 3-aminopropyl triethyl silane(APrTES), 3-aminophenyl trimethoxy silane(APTMS), 3-aminophenyl triethoxy silane (APTES), and a combination thereof.

6. The process according to claim 1, wherein said monomer of formula $R^3—Si(R^4)_3$ is selected from the group consisting of methyl trimethoxy silane (MTMS), trimethoxy silane (TMS), triethoxy silane (TES), methyl triethoxy silane (MTES), phenyl trimethoxy silane (PTMS), phenyl triethoxy silane (PTES), vinyl trimethoxy silane (VTMS), vinyl triethoxy silane (VTES), trichlorosilane, methyl trichloro silane, phenyl trichloro silane, vinyl trichloro silane, and a combination thereof.

* * * * *